Feb. 4, 1936. R. W. SPRINGER Re. 19,847

ANTISQUEAK STRIP

Original Filed Dec. 23, 1933

INVENTOR.
Ray W. Springer
BY
Parker & Burton
ATTORNEYS.

Reissued Feb. 4, 1936

Re. 19,847

UNITED STATES PATENT OFFICE 19,847

ANTISQUEAK STRIP

Ray W. Springer, Detroit, Mich.

Original No. 2,007,549, dated July 9, 1935, Serial No. 703,853, December 23, 1933. Application for reissue September 3, 1935, Serial No. 39,071

9 Claims. (Cl. 280—152)

My invention relates to improvements in antisqueak strips or webs. Strips of this character are used between metal parts to eliminate the squeaks and noise produced by relative movement of the parts. They are widely used in the automobile industry and particularly in automobile body construction. One specific use is between the fender and the adjacent body portion.

Such strips include a web portion and a marginal bead portion. The web portion is adapted to be inserted between the two adjoining metal parts. The metal parts are secured together through this web portion. The strip is so positioned between the metal parts that the bead portion extends along and overlies the joint between the metal parts. The bead has a finished outer surface so that it presents a neat finished appearance.

My invention relates to improvements in strips of this type. One object of my invention is the provision of a strip of this nature which is inexpensive, which is moisture resistant, which is yieldingly compressible and resilient, and which is adapted to seal the joint between the two metal parts and further to seal itself adhesively across said metal parts preventing the ingress of dirt or water into the joint between said parts.

A characteristic of my invention is that the web width which is disposed between the adjoining metal parts is impregnated with latex which forms a connective film filling the interstices of the material and extending in the form of a moisture resistant envelope over the outer surface of the web. In addition, it renders the web compressible and resilient and it further seals the opposed surfaces of the web width against the adjoining metal faces preventing the seepage of water into the joint.

Figure 2:
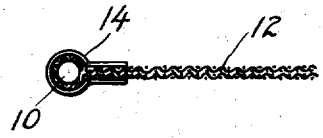
Figure 1:
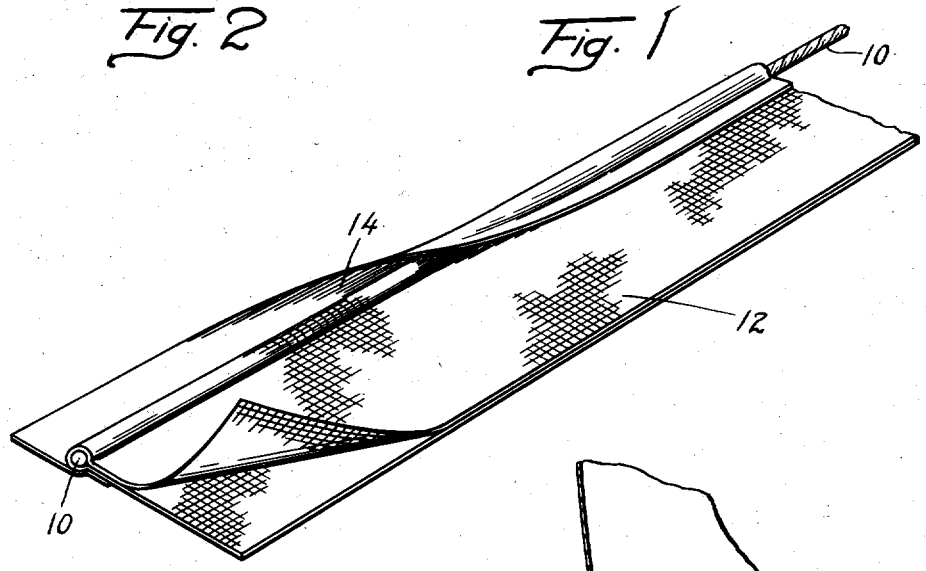
Figure 3:
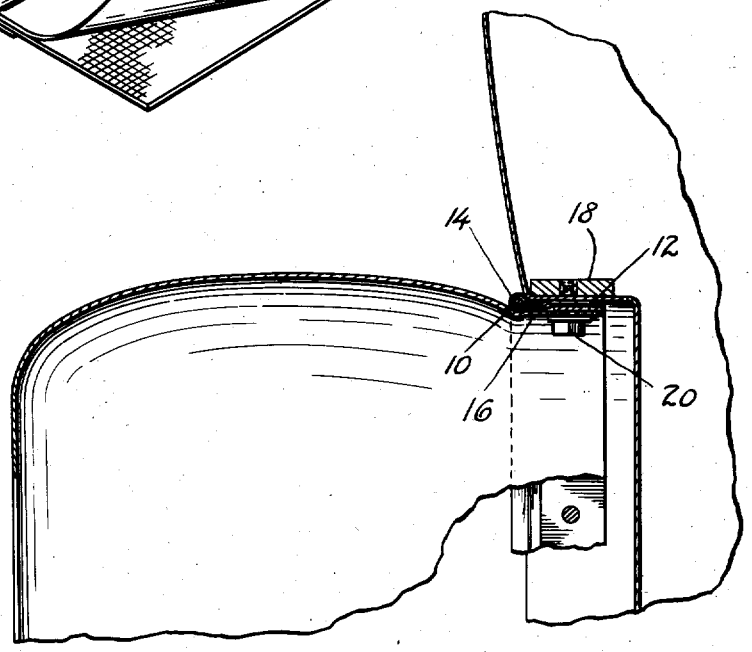

Other objects, advantages, and meritorious characteristics of my invention will more fully appear from the following specification, appended claims, and accompanying drawing, wherein:

Figure 1 is a perspective of my improved welt partly unfolded to show the structure, Fig. 2 is a cross sectional view transversely of the welt shown in Fig. 1, and Fig. 3 is a sectional view through a fragment of a body structure showing the employment of my invention.

My improved antisqueak strip is formed of a width of webbing of suitable fibrous material. I prefer to employ a loosely woven fibrous material such as jute webbing. This material is impregnated with a suitable latex compound. The latex compound may be allowed to set to a tacky condition and the strip then folded over a cord or the like, indicated as 10. This cord may be formed of twisted paper or any other suitable material. The strip is brought together over the cord and the separate folds are pressed together. This operation results in the formation of a double thickness of material 12 extending away from the cord in the form of a web.

As a result of the impregnation with the latex compound and the compression of the folds together the web portion 12 is thoroughly impregnated with the latex and the interstices thereof are filled with such compound.

The latex extends as a film between the two layers of the material. It extends as a film over the outer surface of the web. It forms a resilient connective film enveloping the web.

A strip of finish fabric 14, such as artificial leather or the like, is then folded over the covered cord as shown completing the formation of the bead. This finish strip is adhesively held in place thereover and upon both sides of the web as illustrated. The latex compound which was used to impregnate the web adhesively secures this strip in place. An additional layer of adhesive may be used underneath said strip if found desirable. It is unnecessary to employ any stitching or any other securing means in a construction of this character. Adhesive compound is sufficient to secure the several parts of the finished article together.

The latex compound is utilized in a sufficient quantity so that it renders the web yieldingly compressible and resilient.

In the drawing the complete strip is illustrated as disposed between adjoining metal parts 16 and 18 which are held together by fastening means 20. The strip completely seals the joint between such parts filling the irregularities of the opposed surfaces of the parts. In addition, it seals itself against the adjoining surfaces of the metal parts. Along and adjacent to the bead it is present in such an amount that it forms a yielding cushion-like layer that fills the spaces between the metal parts at the entrance to the joint. Should any water seep in, however, it will not penetrate sufficiently to rust the metal parts or rot the fabric material as the two surfaces of the web portion are sealed against the opposed adjacent metal faces.

The impregnation of the web material and the compression of the double thickness thereof forms a web portion which possesses sufficient stiffness so that it is self-supporting. It is stiffly self-supporting so that it may be readily inserted within relatively limited spaces between the metal parts, yet it is sufficiently flexible and compressible to accurately conform to irregularities of the surfaces which it adjoins.

A suitable latex compound may be formed of 50 c. c. m. of rubber latex, 4 c. c. m. of saturated Burgundy pitch solution, and 20 drops of Neozone L.

The amount of the saturated Burgundy pitch solution may be varied up to 6 c. c. m. with the amount of latex set forth above and the Neozone L may be increased up to 60 drops in the schedule set forth above.

The pitch solution is a solution formed of a Burgundy pitch in a suitable solvent such as ammonia and wherein pitch is dissolved to the maximum capacity of the solvent. The Neozone L (a commercial product) is an anti-oxidant and other similar suitable anti-oxidants might be used. A formula such as the above, which is a water emulsion of a rubber latex compound, is preferred. By latex or latex compound I mean a water emulsion of rubber which comprises the natural product, latex, modifications or compounds thereof, or artificial aqueous dispersions of rubber.

What I claim:

1. An antisqueak strip comprising a length of fibrous material folded upon itself forming a double thickness web, a cord extending along one linear margin of the web, said material being impregnated with a latex compound and said two layers being compressed together with the latex adhesively securing them together and forming a permanently tacky moisture resisting film extending over each outer surface of the web and a film extending between the two layers constituting the web and through the interstices of the two layers, and a finish strip folded over the folded edge of the web and adhesively secured thereto.

2. An antisqueak strip comprising a loosely woven web width so impregnated with a suitable latex compound as to form a latex coating over the individual fibers of the web material, said width of material folded lengthwise upon itself into a double thickness web and compressed together, said latex compound adhesively securing the folds of the material together and forming a film therebetween and a film thereover and extending through the interstices of the material, a cord extending between the folds along the fold line, and a strip of hard surfaced finish material folded over the folded edge of the web and adhesively secured thereto by the outer coating of latex on the web width, said web width containing sufficient latex characterized by being normally tacky to render the same sufficiently stiff to be self-supporting while retaining yielding flexibility and resiliency.

3. An antisqueak strip comprising two superimposed layers of loosely woven fibrous webbing impregnated throughout with a latex compound forming a latex covering enclosing the individual fibers which make up the webbing, a cord extending along one linear margin of said superimposed layers, said layers being compressed together and held together by the latex compound with which the layers are impregnated, said latex compound extending between said layers and through the interstices thereof to the outer surface of each layer rendering the two layers and the individual fibers which make up the same water-resisting, and rendering said two layers sufficiently rigid to be self-supporting as a unitary structure, and a strip of finishing material folded over said cord and adhesively secured to the opposite surfaces of said superimposed layers.

4. A welt comprising a bead filler, a strip of loosely woven fabric impregnated with a latex compound and folded over the bead filler so as to provide a bead portion at one edge of the welt with a leg projecting therefrom, and a finish strip folded over said bead portion and adhesively secured thereto, said latex compound adhesively securing said folds together.

5. A welt comprising a bead portion, superimposed layers of loosely woven fabric impregnated with and adhesively secured together by a latex compound and adhesively secured by latex compound to the bead portion so as to provide a bead along one edge of the welt with a web projecting therefrom, and a finish strip folded over the bead portion overlapping said layers and adhesively secured thereto.

6. An antisqueak strip for use between adjacent structural parts comprising a web of porous fibrous material impregnated with a latex compound imparting a water resistant quality to the material, a bead extending along one edge of said web and including a covering finish strip, said web and bead being adhesively secured together.

7. An anti-squeak strip for use between adjacent structural parts comprising a web formed of a flexible, porous strip of material impregnated with a latex compound rendering the strip water resistant and imparting stiffness thereto, a bead extending along one edge of said web and including a finish strip covering the same, said finish strip being adhesively secured to said web.

8. An antisqueak strip for use between adjacent structural parts comprising a web formed of a porous strip of fibrous material impregnated with a latex compound rendering the material water resistant, a bead extending along one edge of said web and including a filler cord and a finish strip covering the cord, said cord and finish strip being adhesively secured to said web.

9. An antisqueak strip for use between adjacent structural parts comprising a web formed of a plurality of superimposed layers of loosely integrated fibrous material impregnated with a latex compound rendering the material water resistant, a bead extending along one edge of said web and including a finish strip covering, said bead being adhesively secured to the web and said layers being adhesively secured together.

RAY W. SPRINGER.